United States Patent [19]
Gehweiler et al.

[11] 3,970,833
[45] July 20, 1976

[54] HIGH-SPEED ADDER

[75] Inventors: William Frederick Gehweiler, Moorestown; Junius Isaac Pridgen, Cherry Hill, both of N.J.

[73] Assignee: The United States of America as represented by the Secretary of the Navy, Washington, D.C.

[22] Filed: June 18, 1975

[21] Appl. No.: 588,104

[52] U.S. Cl. .............................................. 235/175
[51] Int. Cl.² ......................................... G06F 7/50
[58] Field of Search .................................... 235/175

[56] References Cited
UNITED STATES PATENTS
3,863,061   1/1975   Kazantzis ........................... 235/175

Primary Examiner—R. Stephen Dildine, Jr.
Attorney, Agent, or Firm—R. S. Sciascia; L. I. Shrago

[57] ABSTRACT

A high-speed adder circuit capable of performing addition with binary numbers in 1's complement, 2's complement or sign-magnitude formats. The adder can be made in the form of a single chip that can be assembled in multiple units to expand its capacity. There is a provision for converting minus zero to plus zero so as to prevent oscillations from occurring in the loop circuit. Also, the sum output is automatically shifted to the correct format when an overflow condition occurs.

16 Claims, 8 Drawing Figures

HIGH-SPEED ADDER

The present invention relates generally to a high-speed adder circuit which is capable of performing addition with binary numbers in 1's complement, 2's complement or sign-magnitude formats and which can be made in the form of a single chip that can be assembled in multiple units to proportionally increase the bit capacity of the system.

In digital computer operation, different numbering systems, such as sign-magnitude or 1's complement, may be encountered. Each of these formats usually requires its own peculiar arithmetic circuit, reflecting the distinctive nature of the mathematical rules and manipulative procedures involved. In the past, this has meant that a standard single chip assembly could not be utilized as a basic building block unit for constructing these different adder circuits.

In a 1's complement system, the number 0 has two possible representations. It can be a positive number consisting of all 0's, the +0, or a negative number consisting of all 1's, the −0. When adding two numbers of equal magnitude and opposite sign, the +0 number results when there is an end-around carry. The −0 number appears if there is no such end-around carry. However, due to the sequential nature of the adder circuit, some of the outputs may initially be 1's while others may be 0's depending upon whether or not the individual adder stages see a carry input. This can cause a sustained oscillation to appear in the closed loop formed by the interconnection between the carry-out terminal of the most significant bit stage and the carry-in terminal of the least significant bit stage. To prevent this possible oscillation and the appearance of an incorrect solution, the present invention includes a provision, the all 1's gating scheme, for detecting the onset of such a condition and introducing an end-around carry signal for converting the −0 to a +0.

In many systems, it is desirable that the sum output contain the same number of bits as each of the input numbers. However, when adding two large positive numbers, it is likely that a carry-out signal will be developed at the most significant bit stage of the adder. This overflow can also occur when adding two negative numbers when there is no carry-out from the most significant bit stage. In a floating point system when such an overflow occurs, the procedure is to drop the least significant bit, shift all other bits to the next lower bit position, with the last stage carry-out being shifted into the most significant bit position and to increment the exponent.

The adder circuit of the present invention has a provision which results in the sum output being automatically shifted to the correct format whenever such an overflow condition occurs. Even though the least significant bit is shifted out of the output, it remains available. Additionally, the circuit is provided with a means for shifting the sum output format regardless of what the sum may be. This allows a user who does not wish to utilize the automatic overflow provision to operate the adder.

It is, accordingly, a primary object of the present invention to provide a high-speed adder which is capable of processing two multi-bit binary numbers which may be in either the sign-magnitude, 1's complement or 2's complement format.

Another object of the present invention is to provide a high-speed adder which can perform addition on binary numbers which are in 1's complement, 2's complement or sign-magnitude format and which automatically detects an overflow condition.

Another object of the present invention is to provide a high-speed binary adder which can be fabricated as a single chip device that can serve as a building block for constructing adders of increased bit capacity.

Another object of the present invention is to provide a high-speed adder which is capable of performing 1's complement addition and which contains a provision for preventing the appearance of a −0 answer which may cause oscillation in the circuit.

Another object of the present invention is to provide a high-speed binary adder wherein the sum output contains the same number of bits as each of the input numbers.

Other objects, advantages and novel features of the invention will become apparent from the following detailed description of the invention when considered in conjunction with the accompanying drawings wherein.

Figure 1:
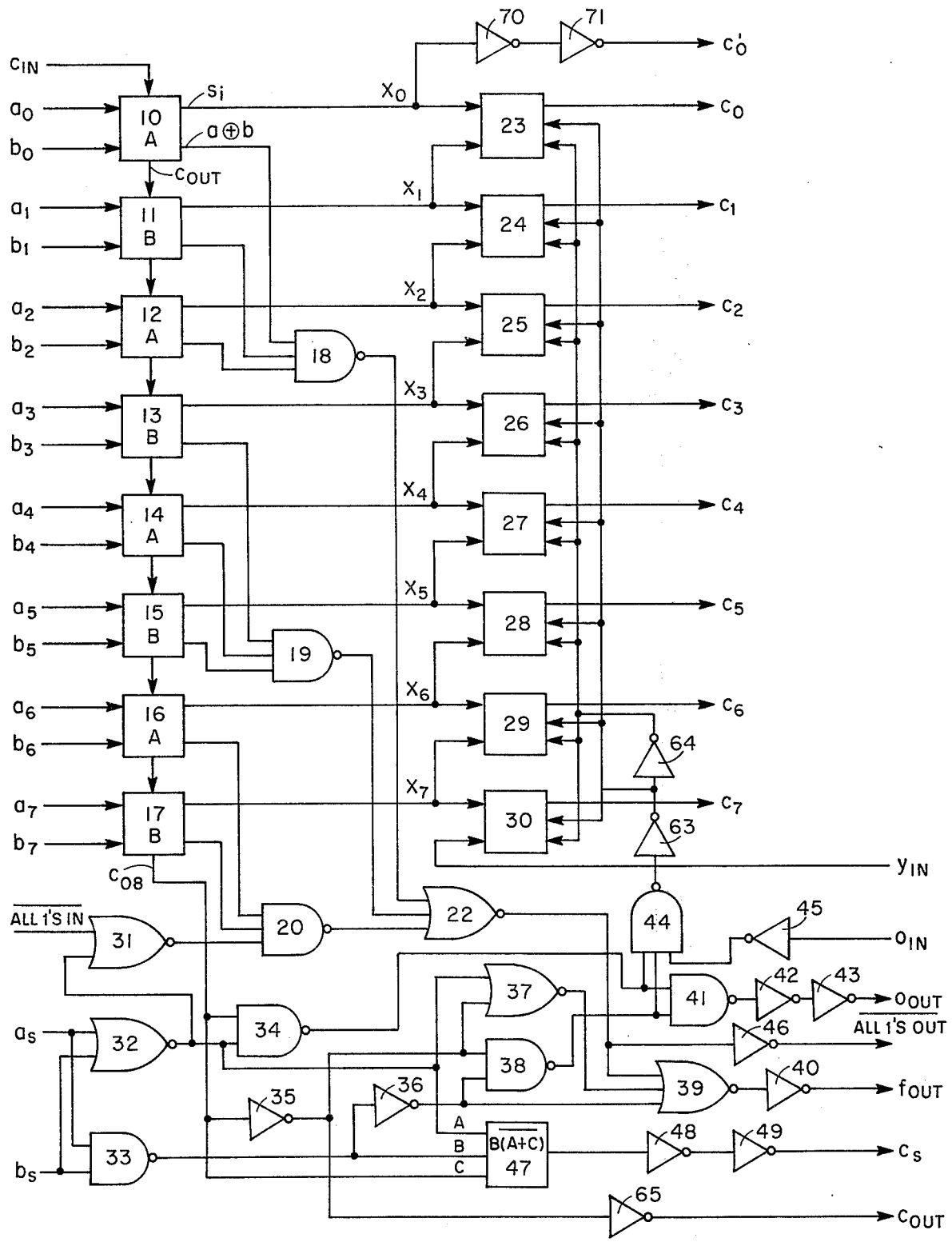
FIG. 1 is a schematic diagram of an 8-bit plus sign adder constructed according to the present invention.

Referring now to FIG. 1, it will be seen that the high-speed adder circuit, which in this illustrative embodiment is processing two 8-bit numbers plus a sign bit, includes four so-called A type adder stages 10, 12, 14, 16, serially interconnected with a like number of B type adder stages. Stage 10, which is the first A stage in this series sequence, adds the least significant bits and has, as is customary, a pair of input lines, $a_o$ and $b_o$, a carry-in line, $C_{in}$, a sum output line, $S_o$, and a carry-out line, $C_{out}$. Additionally, this stage, as well as all other stages, is provided with a second output line at which the partial sum, the quantity $a_o \oplus b_o$, appears.

Figure 2:
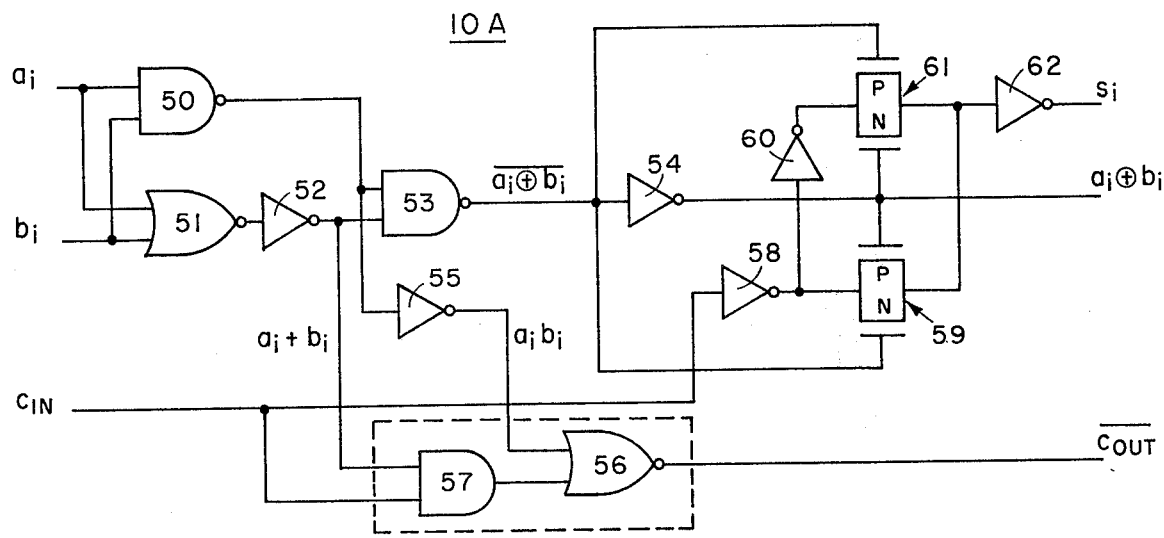
FIG. 2 shows the details of one type of adder stage utilized in the system of FIG. 1.

The details of a typical A type adder stage are shown in FIG. 2. From an examination of this circuit, it will be seen that the input bits which here bear the generic notations $a_i$ and $b_i$ are applied both to a NAND gate 50 and a NOR gate 51. The output of NOR gate 51 is inverted in inverter gate 52, and the resultant signal serves as one input to a NAND gate 53 which has as its other input the output from NAND gate 50. The output of NAND gate 53 is inverted in inverter gate 54, and the signal resulting therefrom corresponds to the partial sum $a_i \oplus b_i$.

The output of NAND gate 50 is also inverted in inverter 55 and the inverted signal provides one input for NOR gate 56, the other input of which is derived from AND 57 which has its two inputs, the output of inverter gate 52 and the carry-in signal $C_{in}$. The output of NOR gate 56 corresponds to the signal, $\overline{C_{out}}$.

The carry-in signal $C_{in}$ is inverted in inverter 58. The inverted signal is fed directly to a transmission gate switch 59 and also via a second inverter 60, which effectively restores the signal to its original $C_{in}$ state and to a second transmission switch 61.

Transmission switches 59 and 61 consist of a pair of metallic oxide semi-conductor field effect transistors (MOSFET). More particularly, switch 59, for example, is formed by an N channel and a P channel transistor with both of their source electrodes and drain electrodes interconnected to serve as the input and output terminals of the switch. As is well known, the P type unit exhibits a low impedance corresponding to the closed condition of a switch whenever its gate electrode has the binary signal 0 present thereat, whereas the N type device shows the same low impedance condition when the binary signal 1 is present at its gate electrode. Thus, in the circuit shown in FIG. 2, one or the other of these units will be effectively closed at any one time depending, in the present case, on the siganl $\overline{a_i \oplus b_i}$, the output of NAND gate 53. This signal is, accordingly, fed directly to the insulated gate of the P type device of switch 61 and to the insulated gate of the N type device of switch 59. Also, the same signal after inversion in inverter 54 is applied to the insulated gates of the N and P devices of these same switches. Thus, for example, when the output of NAND gate 53 is at logic 1, switch 59 is closed since, at this time, a 1 is at the gate of its N device and a 0 is at the gate of its P device. By the same token, switch 61 is open because of the 1 condition at the gate of its P device and the 0 condition at the gate of its N device. When switch 59 is closed in this manner, it will be seen that the output of inverter 58 is coupled through it to inverter 62. The output of inverter 62 is the sum signal $S_i$, and in the particular example being described, this sum signal corresponds to $C_{in}$ because of the combined action of the inverters 58 and 62. However, when switch 61 is closed, the sum signal is the inverse of $C_{in}$ because of the further behavior of the additional inverter 60, which is included in the signal processing circuit.

The operation of the adder stage shown in FIG. 2 is summarized by the following table:

TABLE I

| | | F. A. (A) | | | |
|---|---|---|---|---|---|
| $C_{in}$ | $a_i$ | $b_i$ | $S_i$ | Partial Sum $a \oplus b$ | $\overline{C_{out}}$ |
| 0 | 0 | 0 | 0 | 0 | 1 |
| 0 | 0 | 1 | 1 | 1 | 1 |
| 0 | 1 | 0 | 1 | 1 | 1 |
| 0 | 1 | 1 | 0 | 0 | 0 |
| 1 | 0 | 0 | 1 | 0 | 1 |
| 1 | 0 | 1 | 0 | 1 | 0 |
| 1 | 1 | 0 | 0 | 1 | 0 |
| 1 | 1 | 1 | 1 | 0 | 0 |

Figure 3:
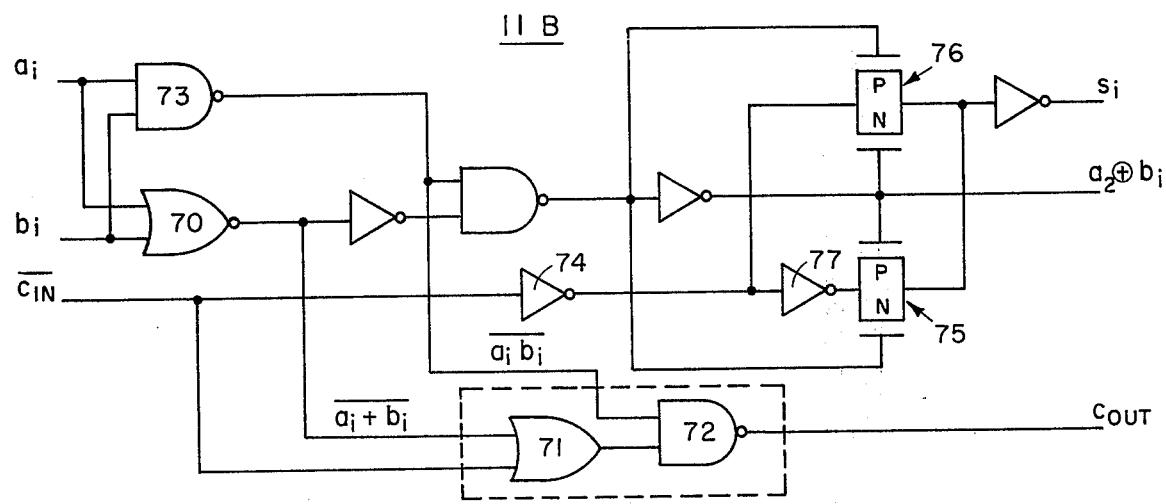
FIG. 3 shows the details of another type of adder stage utilized in the system of FIG. 1.

Since an A type adder stage produces an inverted carry-out signal, that is $\overline{C_{out}}$, each next adder stage in the sequence must be modified to take this signal condition into account. Although an extra inverter could be introduced into the circuit to restore the carry signal to $C_{out}$, this modification would increase the delay in the operation of each stage and diminish the response time of the overall adder circuit. FIG. 3 shows a typical B adder stage, such as 11B, which performs with a $\overline{C_{in}}$ instead of a $C_{in}$.

An examination of FIG. 3 will reveal that this circuit arrangement differs from its companion in that the output of NOR gate 70, whose counterpart is NOR gate 51 in FIG. 2 and the $\overline{C_{in}}$ signal are applied to an OR gate 71 instead of an AND gate like gate 57. The output of this OR gate 71 serves as one input to a NAND gate 72 which differs from the NOR gate 56 in FIG. 2, and this NAND gate has as its other input, the output of NAND gate 73, the equivalent of NAND gate 50 in FIG. 2.

The circuit which develops the partial sum signal $a_i b_i$ is the same and so is the arrangement for controlling the various gates of the transmission switches 75 and 76. However, the signals coupled to the source electrodes of these switches are reversed in the $\overline{C_{in}}$ after inversion in circuit 74 to $C_{in}$ is fed directly to the source electrodes of switch 76 while $\overline{C_{in}}$, as a result of successive inversion in 74 and 77, appears at the source electrodes of switch 75. The operation of a B type adder stage such as that just described is summarized in the following table:

TABLE II

| | | F. A. (B) | | | |
|---|---|---|---|---|---|
| $\overline{C_{in}}$ | $a_i$ | $b_i$ | $S_i$ | $a \oplus b$ | $C_{out}$ |
| 0 | 0 | 0 | 1 | 0 | 0 |
| 0 | 0 | 1 | 0 | 1 | 1 |
| 0 | 1 | 0 | 0 | 1 | 1 |
| 0 | 1 | 1 | 1 | 0 | 1 |
| 1 | 0 | 0 | 0 | 0 | 0 |
| 1 | 0 | 1 | 1 | 1 | 0 |
| 1 | 1 | 0 | 1 | 1 | 0 |
| 1 | 1 | 1 | 0 | 0 | 1 |

The overall adder, as mentioned hereinbefore, thus, consists of an A stage, such as 10, having its carry-out terminal connected to the carry-in terminal of a B stage, such as 11, with the carry-out terminal of this stage in turn connected to the carry-in terminal of a second A type stage 12 and so on. Since in the embodiment shown, an 8-bit number is being processed, the complete system, therefore, has four A stages and four B stages.

The sum signals $S_i$ from the eight adder stages are fed to a corresponding number of switches 23, 24, 25, 26, 27, 28, 29 and 30 as one input thereof. The other input to each of these switches, except the last 30, is derived from the next successive higher stage in the adder, that is, the second input to switch 23 is the sum signal $S_i$ from stage 11 while the second input to switch 24 is the sum signal from stage 12 and so on. This is true for all switches except switch 30 associated with the adder stage 17 which is processing the most significant bit. Here, the second input consists of the carry-out signal $C_{08}$ from adder stage 17. The two successive inversions performed on this carry-out signal by inverters 35 and 65 do not, of course, alter the condition of this signal as it appears at switch 30.

Figure 4:
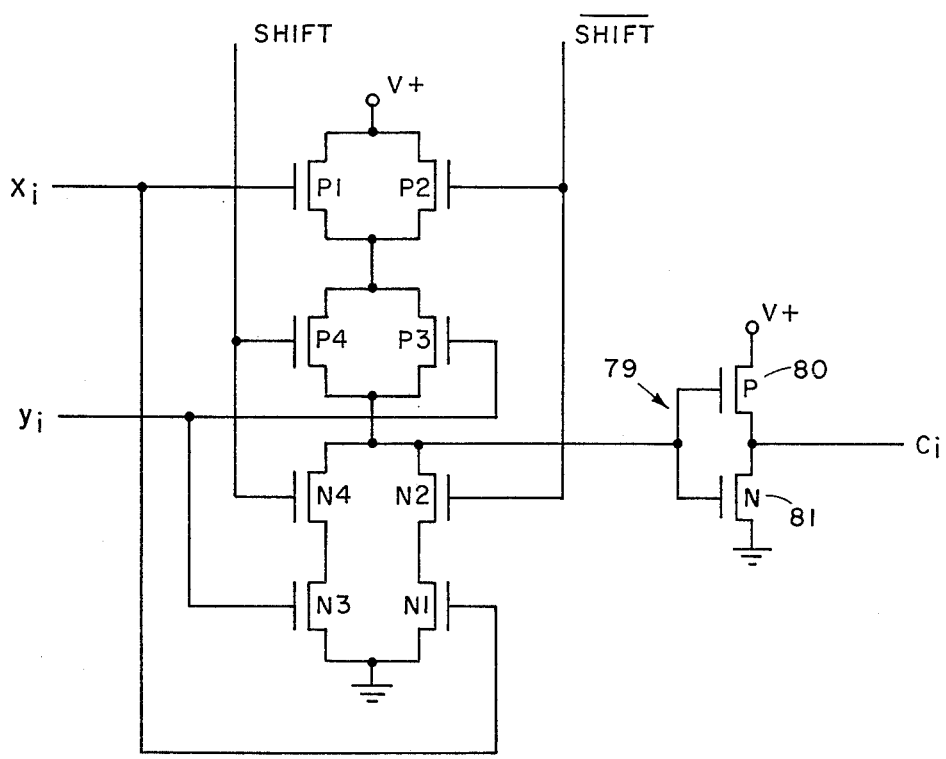
FIG. 4 is a circuit diagram of one of the switches utilized in the arrangement of FIG. 1.

The details of the various switches, such as 23 and 24, are shown in FIG. 4. In this figure for descriptive purposes, the upper signal is $x_i$ and the lower signal, $y_i$. The signals controlling these switches are a shift and a $\overline{shift}$ signal whose origin, as will be seen hereinafter, is obtained from the logic portion of the circuit of FIG. 1. When the $\overline{shift}$ signal available from inverter 64 in this circuit is at 0 logic and the shift is at 1 logic, then, as will be seen hereinafter, the switches operate so that the signal present at the upper input line, $x_i$, is connected to the output line $c_i$. This represents the normal mode of operation of the circuit, and in the arrangement of FIG. 1, the output of the adder, $C_0$ to $C_7$ will correspond to $x_0$ to $x_7$. In the shift mode, this output will correspond to $x_1$ to $x_7$, and the last bit, the most significant bit, will be the carry-out signal from stage 17.

Each of the switches includes eight MOSFET devices, P1, P2, P3 and P4 and N1, N2, N3 and N4 of the type previously described hereinbefore. P1 and P2 are connected in parallel, and their parallel combination is connected in series with the parallel combination of P3 and P4. N1 and N2 are connected in series and N4 and N3 are connected in series, and both of these series pairs are connected in parallel, with this parallel combination being in series with the other combinations between a positive reference voltage and ground. The input signal $x_i$, the upper input, is connected to the gate electrode of P1 and the gate electrode of N1. The second input $y_i$, the lower input is connected to the gate electrode of P3 and the gate electrode of N3. The shift signal is connected to the gate electrodes of P4 and N4 and the $\overline{\text{shift}}$ is connected to the gate electrodes of P2 and N2.

An inverter 79 in the form of a P device 80 and an N device 81 with their gates connected to the junction between the parallel network of N1, N2, N3 and N4 and two series networks made up of P1 and P2 and P4 and P3 is part of this arrangement. The source electrode of 80 is connected to a positive voltage, and the drain electrode thereof is connected to the source electrode of unit 81, whose drain is grounded. This interconnection serves as the output terminal where the signal $c_i$, shown in FIG. 1, appears.

The operation of this switch is summarized in Table III, and it will be seen from an inspection of this table that when the shift signal is at logic 0, $c_i$ corresponds to $x_i$, and when this signal is at logic 1, $c_i$ corresponds to $y_i$. The latter condition, as will be seen hereinafter, occurs whenever an overflow condition is detected and a 1 logic condition appears at terminal $O_{out}$:

TABLE III

| | | | | SWITCH | | | | | | | | |
|---|---|---|---|---|---|---|---|---|---|---|---|---|
| $\overline{\text{Shift}}$ | Shift | $x_i$ | $y_i$ | P1 | P2 | P3 | P4 | N1 | N2 | N3 | N4 | $c_i$ |
| 1 | 0 | 0 | 0 | *cl | *op | cl | cl | op | cl | op | op | 0 |
| 1 | 0 | 0 | 1 | cl | op | op | cl | op | cl | cl | op | 0 |
| 1 | 0 | 1 | 0 | op | op | cl | cl | cl | cl | op | op | 1 |
| 1 | 0 | 1 | 1 | op | op | op | cl | cl | cl | cl | op | 1 |
| 0 | 1 | 0 | 0 | cl | cl | cl | op | op | op | op | cl | 0 |
| 0 | 1 | 0 | 1 | cl | cl | op | op | op | op | cl | cl | 1 |
| 0 | 1 | 1 | 0 | op | cl | cl | op | cl | op | op | cl | 0 |
| 0 | 1 | 1 | 1 | op | cl | op | op | cl | op | cl | cl | 1 |

*cl — closed
*op — open

The adder circuit of FIG. 1 also includes a NOR gate 32 and a NAND gate 33, and the bits which indicate the signs of the two numbers being processed $a_s$ and $b_s$ are normally fed to both of these gates. The output of NOR gate 32 is applied to one input of NAND gate 34, to one input of NOR gate 31, to one input of NOR gate 37 and to the top input A of a logic circuit 47 which performs the operation $\overline{B(A+C)}$. NOR gate 31 has an all 1's signal applied to it as a second input, and when the circuit of FIG. 1 is operating independently as a unitary device and not employed as a component of an expanded adder, the logic O can be permanently set into this NOR gate.

The output of NAND gate 33 is applied to the B terminal of circuit 47 and after inversion in 36 to one input of NAND gate 38 and NOR gate 39. The carry-out signal $C_{OS}$, from the MSB stage 17, is applied directly to one input of NAND gate 34, to the C input of circuit 47 and after inversion in 35, to one input of NAND gate 38 and NOR gate 37. The output of inverter 35 is once again inverted in 65 and the resultant signal $C_{out}$, as mentioned hereinbefore, corresponds to $C_{OS}$. This $C_{out}$ signal is coupled to the $y_{in}$ terminal which provides the most significant bit when the adder is shifted by an overflow signal. When the circuit of FIG. 1 is used as part of an expanded adder, this $C_{out}$ terminal is connected, for example, to the $C_{in}$ terminal of a similar circuit as further described hereinafter.

NAND gate 34 has its output fed to one input of NAND gates 44 and 41. The second input to NAND gate 41 is obtained from the output of NAND gate 38. The output of NOR gate 37 serves as the second input to NOR gate 39 whose third input is obtained from NOR gate 22. The output of NOR gate 39 is inverted in 40, and this inverted signal is $F_{out}$. In the arrangement of FIG. 1, this terminal is connected to $C_{in}$ of the first adder stage 10 in the chain.

The output of NOR gate 22 after inversion in 46 becomes the all 1's output signal which is required when two circuits of the type shown in FIG. 1 are interconnected to double the bit capacity of the adder. The output of NAND gate 41 is subjected to two successive inversions in 42 and 43 to yield the overflow signal $O_{out}$.

A $O_{in}$ signal obtained from an external source, not shown, is applied to inverter 45 and the inverted signal resulting therefrom constitutes the third input to NAND gate 44 whose output is inverted once in 63 to yield the signal $\overline{\text{shift}}$ and a second time to produce shift, the signals controlling the operation of the various switches 23 to 30. This $O_{in}$ signal, it will be appreciated, provides a means for shifting the output number independent of the automatic provision of FIG. 1.

The output of logic circuit 47 is subjected to two successive inversions in 48 and 49 and the resultant signal is $C_s$, the sign signal.

In order to preserve the sum signal from the first adder stage 10, which represents the least significant bit when this bit is shifted out by an overflow signal, the circuit includes a pair of inverters 70 and 71 connected in series to the $S_i$ line of adder stage 10.

To prevent a possible oscillation from occurring in the circuit of FIG. 1 when the solution is $-0$, the partial sum signals $a \oplus b$, from stages 10, 11 and 12 are fed to a first NAND gate 18 while the same signals from stages 13, 14 and 15 are fed to a second NAND gate 19 and the last two such signals from stages 16 and 17 are fed to a third NAND gate 20. NAND gate 20 has as its third input the output from NOR gate 31 which, as mentioned hereinbefore, has one of its inputs preset to provide a logic 1 output for this NOR gate.

It will be appreciated that the partial sum signals are available prior to the appearance of any carry-in signal since the components which developed these signals are not influenced by the carry-in signals. For example, in FIG. 2, the circuit involved consists of NAND gate 50, NOR gate 51, inverter 52, NAND gate 53 and inverter 54. This, in effect, allows the $-0$ state to be detected prior to the addition of the carries.

The output of NAND gates 18, 19 and 20 provide the three inputs to NOR gate 22, whose output, as described previously, is fed to inverter 46 and to one input of NOR gate 39. It is the latter NOR gate and its inverter 40 which produce the $F_{out}$ signal which, in the circuit of FIG. 1, is fed to $C_{in}$ of adder stage 10 to convert the −0 to the +0, the transformation which prevents the unwanted oscillation from developing in the loop circuit.

In the operation of FIG. 1 when all of the partial sum signals $a \oplus b$'s are at logic 1 and with $a_s$ and $b_s$ of opposite signs and the $\overline{\text{all 1's in}}$ signal at logic O, NAND gates 18, 19 and 20 have their outputs at 0 logic. Consequently, NOR gate 22 produces a logic 1. The logic 1 appearing as one of the inputs of NOR gate 39 develops the logic 0 which is subsequently inverted to 1 by inverter 40. This signal, as just mentioned, is responsible for preventing the occurrence of a −0 solution.

When the circuit is performing 1's complementary addition, and if both input numbers are negative, then, as is well known, a 1 must be added to the LSB position. With both numbers negative, a 0 logic condition occurs in the output of NAND gate 33 which is inverted by 36, and the 1 logic present at the lowest input terminal of NOR gate 39 produces a 0 logic output condition which is, thereafter, inverted in 40 to give a 1 at the $F_{out}$ terminal. In this way, the end-around carry required in the above-mentioned operation is obtained.

Under the same circumstances, if the input numbers are of opposite sign with the sum a positive number, the same logic 1 condition is required. With $a_s$ and $b_s$ having such different signs, then the output of NOR gate 32 will be at 0 logic, and this 0 condition will appear at the upper terminal of NOR gate 37. If, at this time, a carry-out signal $C_{O8}$ is present, this signal will be inverted by 35, and a 0 logic will also be present at the lower terminal of NOR gate 37. Consequently, NOR gate 37 will have a 1 logic output, and this 1, appearing at the second input terminal of NOR gate 39, will develop a 0 logic in its output which will be inverted to yield the 1 logic at terminal $F_{out}$ as required.

The following table summarizes the conditions responsible for the $F_{out}$ signal being a 1 logic. All other conditions will generate a 0 logic:

TABLE IV

| all $a \oplus b$'s | $a_s$ | $b_s$ | $C_{O8}$ | $F_{out}$ |
|---|---|---|---|---|
| *X | 1 | 1 | X | 1 |
| 1 | 0 | 1 | X | 1 |
| 1 | 1 | 0 | X | 1 |
| X | 1 | 0 | 1 | 1 |
| X | 0 | 1 | 1 | 1 |

*X may be 0 or 1

To summarize the overflow circuit, an overflow will occur when there is a carry-out and $a_s$ and $b_s$ are both 0 logic or when there is no carry-out and both $a_s$ and $b_s$ are 1 logic. Under either of the above two cases, one of the inputs to NAND gate 41 is at 0 logic, and the condition of NAND gates 34 and 38 which bring about these signal conditions can be traced backward to the NOR gate 32, NAND gate 33 and the stage 17, the most significant bit adder stage of the chain.

The operation of the shift portion of the circuit is as follows: For the system to be in the unshifted position and to remain in this condition, all three inputs to NAND gate 44 must be at 1 logic. Consequently, a 0 logic condition, or so-called inhibit signal, must be present at terminal $0_{in}$. If there is no carry-out, NAND gate 34 will produce a 1 logic at a second input to NAND gate 44. However, if there is a carry-out then NOR gate 32 must produce a 0 output and this means, in effect, that both $a_s$ and $b_s$ must have a positive sign or have different signs. Alternatively, if there is no carry-out then the lower input of NAND gate 38 must be at 0, or NAND gate 33 must produce a 1 which occurs when $a_s$ and $b_s$ are opposite sign or both positive. Furthermore, if there is a carry-out, inverter 35 and NAND gate 38 combine to produce the third 1 logic needed at NAND gate 44. The following table summarizes the shift situation:

TABLE V

| $O_{in}$ | $C_{O8}$ | $a_s$ | $b_s$ | Shift |
|---|---|---|---|---|
| 1 | *X | X | X | 1 |
| 0 | 1 | 0 | 0 | 1 |
| 0 | 0 | 1 | 1 | 1 |

*X may be 0 or 1

Thus, for example, anytime a 1 is introduced into the $0_{in}$ line, a shifting operation will be performed. Likewise, as seen from an inspection of the above table, if $a_s$ and $b_s$ are both negative with no carry-out, the same results will occur. All other conditions result in no shift.

The performance of that portion of the circuit of FIG. 1 which produces the signal $C_s$, the sign signal, is set forth in the following table, and it will be recognized from an examination of this table that the sign is determined by the carry-out signal $C_{O8}$ and the $a_s$ and $b_s$ sign bits:

TABLE VI

| $a_s$ | $b_s$ | $C_{O8}$ | A | B | C | $\frac{B(A+C)}{C_s}$ |
|---|---|---|---|---|---|---|
| 0 | 0 | 0 | 1 | 1 | 0 | 0 |
| 0 | 0 | 1 | 1 | 1 | 0 | 0 |
| 0 | 1 | 0 | 0 | 1 | 0 | 1 |
| 0 | 1 | 1 | 0 | 1 | 1 | 0 |
| 1 | 0 | 0 | 0 | 1 | 0 | 1 |
| 1 | 0 | 1 | 0 | 1 | 1 | 0 |
| 1 | 1 | 0 | 0 | 0 | 0 | 1 |
| 1 | 1 | 1 | 0 | 0 | 1 | 1 |

In the 1's complement representation of negative numbers, the 1's of the sign magnitude number are replaced with 0's while the 0's are replaced with 1's. The sign bit remains a 1 for negative numbers, and both the inputs and output sum are in 1's complement form or negative. In this mode of operation, the two numbers which are to be added enter on the $a_0$ to $a_7$ and $b_0$ to $b_7$ inputs with the $a_0$ and $b_0$ being the least significant bits LSB's while $a_7$ and $b_7$ are the most significant bits, MSB's, and the respective sign bits are $a_s$ and $b_s$.

As mentioned hereinbefore, the arrangement of FIG. 1 can also be used in systems employing the 2's complement representation of negative numbers. The 2's complement of a number is formed by changing 1's to 0's and 0's to 1's in the magnitude portion of the number and then adding 1.

When used as 2's complement adder, the end-around carry is not needed. Consequently, in the circuit of FIG. 1, the $F_{out}$ is not used. There is no −0 in 2's complement since the negative all 1's number represents the decimal number −1. The overflow and output sign circuits of FIG. 1 operate in the same manner as they do in the 1's complement case.

Although the above description sets forth the operation for words using 8-bits plus sign, the adder can be used for words which are greater than or less than 8-bits. Words of a given bit size in 1's complement or 2's complement form are readily converted to larger bit sizes without changing the value simply by assigning the sign bit value to the added MSB's. Therefore, the adder can be used for words which are less than 8-bits by connecting the sign bit signal to the unused MSB inputs.

Figure 5:
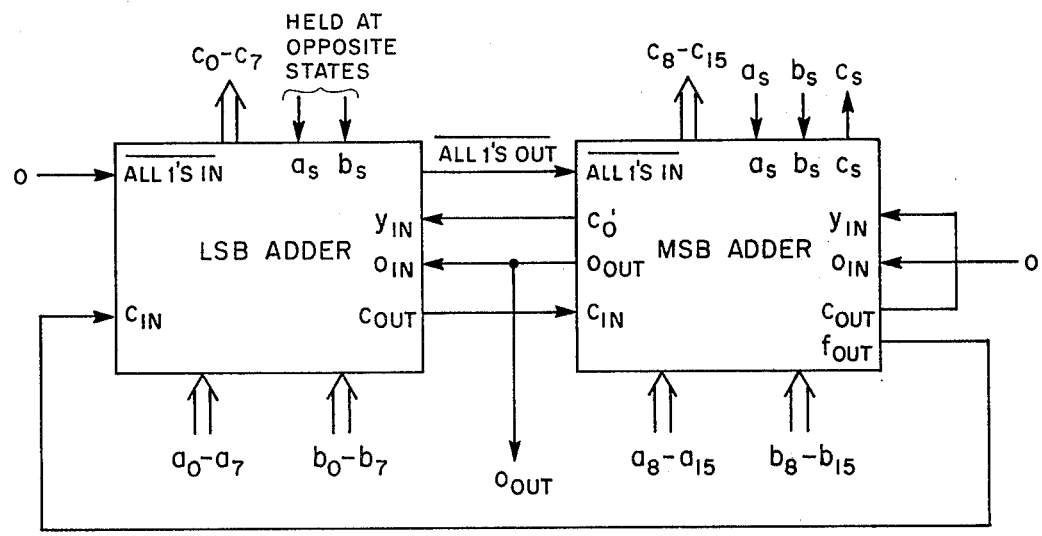
FIG. 5 illustrates how two adder circuits of the type shown in FIG. 1 may be interconnected to form a 16-bit 1's complement adder.

Two adders similar to the one depicted in FIG. 1 can be interconnected to accommodate 16-bit plus sign words in the overflow mode of operation as shown in FIG. 5. One of these adders is called the LSB adder; the other, the MSB adder. Three output signals are unused on the LBS adder. Three of the inputs are connected to permanent states. The all 1's input is at a 0 logic which enables the all 1's gating scheme to operate normally. The $a_s$ and $b_s$ inputs are connected to any "1", "0" combination which again enables this gating scheme to operate normally. Only the $\overline{\text{all 1's}}$ output signal is not used in the MSB adder.

Three of the interconnections between the adders expand the overflow feature $C_o$ to $y_{in}$, $O_{out}$ to $O_{in}$ and $\overline{\text{all 1's}}$ out to $\overline{\text{all 1's}}$ in. The $C_{out}$ to $C_{in}$ connection is the normal expansion connection.

In the expanded system of FIG. 5, the LSB adder generates the 8 LSB's of the output word while the MSB adder generates the 8 MSB's, sign bit and the overflow signal. When the length of the input words are both between 9 and 15 bits plus sign, the same procedure as previously outlined for less than the 8-bit operation is applied to the MSB adder.

Figure 6:
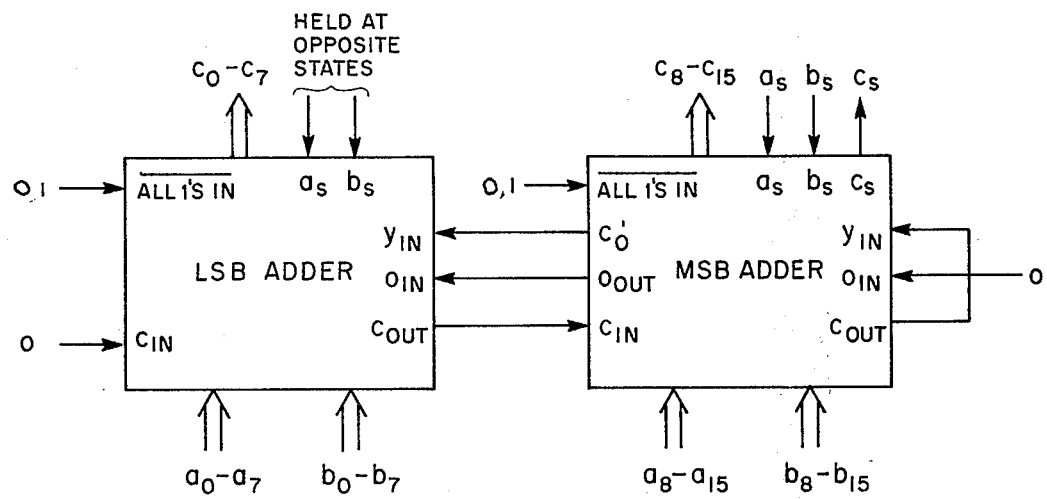
FIG. 6 illustrates how two such adder circuits may be interconnected to form a 16-bit 2's complement adder.

FIG. 6 illustrates the expansion of the adder for the 2's complement case. The differences are that the 2's complement operation does not use the all 1's gating scheme or the feedback scheme from $F_{out}$ to $C_{in}$. The all 1's input may be connected to either the 1 or 0 state. The $C_{in}$ input to the LSB adder is shown connected to the 0 state, but this input can be used if the input signal has the correct format and weight.

Figure 7:
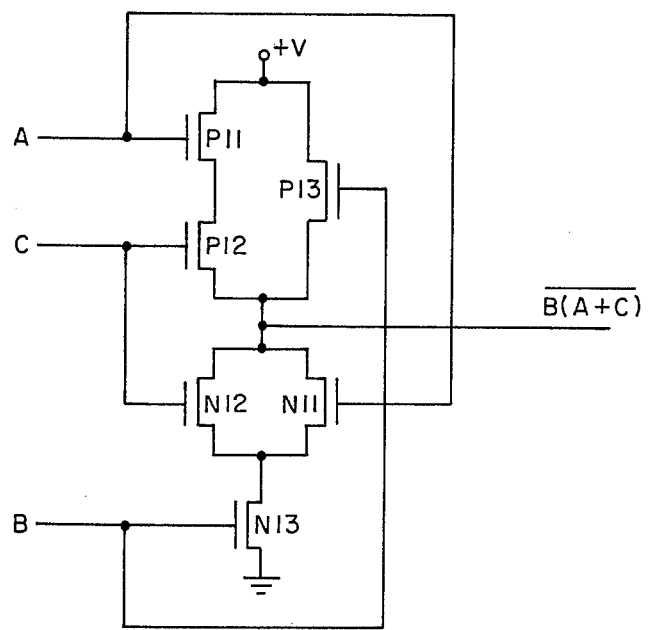
FIG. 7 shows the details of a circuit utilizing MOS devices for performing the operation $\overline{B(A+C)}$.

Circuit 47 in FIG. 1, which carries out the operation $\overline{B(A + C)}$, may take the form of the combination of OR gate 71 and NAND gate 72 as shown within the dashed rectangular box in FIG. 3. The implementation of these gates in complementary MOS devices is shown in FIG. 7, and it will be seen from an examination of this circuit that P11 and P12 are connected in series across P13, and this parallel arrangement is connected in series first with N11 and N12 in parallel and then with N13 alone between a source of positive voltage and ground. The gates of P11 and N11 are interconnected and the signal A is coupled thereto while the gates N13 and P13 are interconnected and the signal B is coupled thereto. And, finally, the gates of P12 and N12 are interconnected, and the signal C is applied thereto. The output is taken at the point where the drain electrodes of P12, P13, N12 and N11 are interconnected. As mentioned hereinbefore, all of the N devices conduct when their gates are at logic 1, here represented by the +V potential, whereas the P devices require a logic 0, here ground, for this condition. Consequently, the output of FIG. 7 is at logic 0 when B is 1 and either A or C or both are at 1 completing a path from ground to the output.

Figure 8:
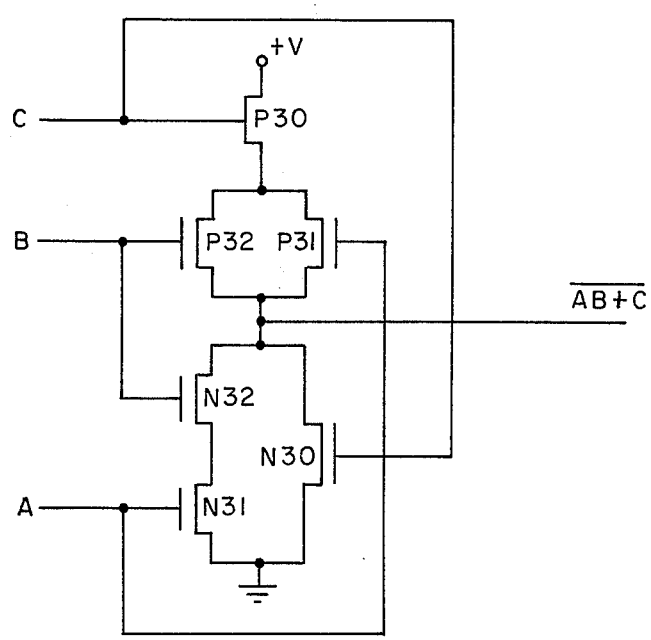
FIG. 8 shows a similar circuit for the operation $\overline{AB+C}$.

The combination of AND gate 57 and NOR gate 56 shown within the rectangular box of FIG. 2 performs the operation $\overline{AB + C}$ and the implementation of these gates with MOS devices is shown in FIG. 8. Here, in this circuit, P30 is connected in series first with the parallel combination of P31 and P32 and then with the combination of N32 and N31 in series across N30. The above sequence is connected between a positive voltage supply and ground. Again, as was the case in FIG. 7, the gates of P30 and N30, those of P31 and N31, and P32 and N32 are interconnected. The signal C is applied to the gates of P30 and N30; the B signal to the gates of P32 and N32; and the A signal to the gates of the P31 and N31. Thus, when A and B are both at 1, or when C is at 1, the output will be at logic 0, since either of these two conditions result in a conducting path from ground to the output.

It would be pointed out that the logic diagram of FIG. 1 is arranged for implementation with MOS devices, and, consequently, it has some features which are peculiar to these devices. For example, there are three locations where two inverters are connected in series in an output signal path such as 48, 49; 42, 43 and 70, 71. The reason for this is that in MOS circuits, internal device sizes are kept as small as possible to reduce capacitance and in turn the dynamic power dissipation. Internal MOS capacitance loads are two or three orders of magnitude less than the external loads normally encountered by output signals. In order to maximize speed, the internal circuits must be buffered from the large external capacitance loads. Consequently, there are always one or two buffering drivers, here the above inverters, between the internal circuits and an output.

What is claimed is:

1. A binary adder comprising, in combination N binary adder stages, each stage having a first and second input terminal at which a corresponding bit designating the magnitude portion of each number is applied, a carry-in and a carry-out terminal, a first output terminal at which the sum S appears, a second output terminal at which the partial sum appears;

means for serially interconnecting said stages so as to form a full adder wherein the carry-out terminal of one stage is connected to the carry-in terminal of the next higher stage and with the carry-out terminal of the most significant bit stage being connected to the carry-in terminal of the least significant bit stage; and means responsive to the appearance of a 1 logic condition at each of the second output terminals when the binary numbers being added are in the 1's complement format for applying a logic 1 to the carry-in terminal of the least significant bit stage whereby the −0 sum is converted to the +0 sum to prevent any oscillations from occurring in the closed loop circuit formed by the interconnections of the carry-out terminals to the carry-in terminals.

2. In an arrangement as defined in claim 1 N output lines; and switching means interconnecting the first output terminals of said adder stages to said output lines such that when said switching means is in a first condition, the number appearing at the output lines corresponds to $S_{LSB}, S_2, S_3 \ldots S_{MSB}$ where LSB, 2 and 3 designate respectively the least significant bit stage, the next higher stage and so forth with MSB being the most significant bit stage and such that when said switching means is in a second condition, the number appearing at the output lines corresponds to $S_2, S_3 \ldots S_{MSB}$ with the carry-out from the MSB stage being the most significant bit.

3. In an arrangement as defined in claim 2 means for producing an overflow signal whenever the numbers being added are in sign-magnitude format and both numbers have positive signs and a carry-out signal occurs at the MSB stage.

4. In an arrangement as defined in claim 3 wherein said last-mentioned means also produces an overflow signal whenever the numbers being added are in the sign-magnitude format and both have negative signs and no carry-out signal occurs at the MSB stage.

5. In an arrangement as defined in claim 4 wherein said switching means is normally in said first condition and is shifted to said second condition whenever an overflow signal is produced.

6. In an arrangement as defined in claim 5 wherein said switching means is also adapted to be placed in said second condition by a shift signal coupled thereto and originating from an external source.

7. In an arrangement as defined in claim 1 wherein the odd and even adder stages operate with carry-in signals that are of opposite binary states and produce carry-out signals that are the inverse thereof.

8. In an arrangement as defined in claim 1 wherein each of said adder stages includes
a first NAND gate and a first NOR gate,
each gate having two input terminals connected in parallel to which corresponding bits of the numbers that are to be added are applied;
a first inverter having its input connected to the output of said first NOR gate;
a second NAND gate,
the output of said first NAND gate being connected to one input of said second NAND gate and the output of said first inverter being connected to a second input of said second NAND gate;
a second inverter,
the output of said second NAND gate being connected to the input of said second inverter corresponding to the second output terminal at which the partial sum appears.

9. In an arrangement as defined in claim 8 wherein each of the odd number adder stages further includes a first AND gate and a second NOR gate,
one input of said AND gate being connected to the output of said first inverter and a second input of said NAND gate being connected to the carry-in terminal at which $C_{in}$ appears;
a third inverter,
the input of said third inverter being connected to the output of said first NAND gate and the output of said third inverter being connected to one input of said second NOR gate,
the second input of said second NOR gate being connected to the output of said AND gate,
the output of said second NOR gate being the carry-out terminal where a $\overline{C_{out}}$ signal appears.

10. In an arrangement as defined in claim 9 wherein each even number adder stage furthr includes
a first OR gate,
one input of said OR gate being connected to the output of said first NOR gate,
another input of said OR gate being connected to the carry-in terminal of that stage at which $\overline{C_{in}}$ appears;
a third NAND gate,
one input of said third NAND gate being connected to the output of said first NAND gate,
another input of said third NAND gate being connected to the output of said OR gate, the output of said third NAND gate being the carry-out terminal at which the $c_{out}$ signal appears.

11. In an arrangement as defined in claim 10 wherein each of the odd number adder stages further includes first and second P and first and second N types MOS devices,
the gate electrodes of said first P and N type devices being interconnected and connected to the output of said second NAND gate,
the gate electrodes of said second P and N devices being interconnected and connected to the output of said second inverter,
the source electrodes of said second P and first N type devices being interconnected and connected to the output of said fourth inverter;
a fifth inverter having its input connected to the output of said fourth inverter,
the source electrodes of said first P and said second N type devices being interconnected and connected to the output of said fifth inverter;
a sixth inverter,
the drain electrodes of all of said P and N type devices being interconnected and connected to the input of said sixth inverter, the output of said sixth inverter being the output terminal at which the sum S appears.

12. A binary adder comprising, in combination
N binary adder stages interconnected to form a full adder capable of processing two N multi-bit numbers which may be in sign-magnitude or 1's and 2's complement format,
each adder stage developing a sum signal and a partial sum signal in response to the application thereto of the corresponding bits of the numbers which are being added; and
means operative whenever the numbers being added are in 1's complement format for preventing the sum signal from registering the −0 number, whereby oscillations in the closed loop circuit formed by the interconnections of the carry-in and carry-out locations of the adder stages are eliminated.

13. In an arrangement as defined in claim 12 wherein said last-mentioned means responds to a 1 logic condition of all of the partial sums and feeds a logic 1 to the carry-in location of the least significant bit stage so as to prevent the −0 sum signal to a +0 sum signal.

14. In an arrangement as defined in claim 12
means for disabling said last-mentioned means whenever the numbers being added are in the sign-magnitude format.

15. A binary adder stage comprising, in combination
a first and second NAND gate;
a first and second NOR gate;
a first AND gate,
each of said gates having a pair of inputs and a single output;
a first, second, third, fourth, fifth and sixth inverter;
means for connecting the inputs of said first NAND gate and said first NOR gate in parallel;
means for connecting the output of said first NOR gate to the input of said first inverter and for connecting the output of said first inverter to one input of said AND gate and second NAND gate;

means for connecting the output of said first NAND gate both to the other input of said second NAND gate and to the input of said third inverter;

means for connecting the output of said third inverter to one input of said second NOR gate;

A carry-in line, $C_{in}$, connected to the other input of said AND gate and to the input of said fourth inverter;

means for connecting the output of said AND gate to the other input of said second NOR gate;

a first and second P type MOS device;

a first and second N type MOS device, the sources of said first P and second N type devices being interconnected, and the sources of second P and first N type devices being interconnected, the gates of said first P and first N type devices being interconnected and the gates of said second P and said second N type devices being interconnected, the drains of all of said devices being interconnected;

means for connecting the output of said second NAND gate to the input of said second inverter and to the gates of said first P and first N type devices;

means for connecting the output of said fourth inverter to the sources of said second P and first N type devices and also to the input of said fifth inverter;

means for connecting the output of said fifth inverter to the sources of said first P and second N type devices; and means for connecting the input of said sixth inverter to all of said drains, whereby whenever corresponding bits of the binary numbers which are to be added are applied to the input terminals of said first NAND and first NOR gates, the sum signal appears at the output of said sixth inverter, the partial sum signal appears at the output of said second inverter and the inverse carry-out signal, $C_{out}$, appears at the output of said second NOR gate.

16. A binary adder stage comprising, in combination
a first, second and third NAND gate;
a NOR gate;
an OR gate;
  each of said gates having a pair of inputs and a single output;
a first, second, third, fourth and fifth inverter;
for connecting the inputs of said first NAND gate and said NOR gate in parallel;

means for connecting the output of said NOR gate to the input of said first inverter and for connecting the output of said first inverter to one input of said second NAND gate;

means for connecting the output of said first NAND gate to the other input of said second NAND gate and to one input of said third NAND gate;

means for connecting the output of said NOR gate to one input of said OR gate;

an inverse carry-in line, $\overline{C_{in}}$, connected to the other input of said OR gate and to the input of said third inverter;

means for connecting the output of said OR gate to the other input of said third NAND gate;

a first and second P type MOS device;

a first and second N type MOS device,
  the sources of said first P and second N type devices being interconnected and the sources of said second P and said first N type devices being interconnected,
  the gates of said first P and first N type devices being interconnected and the gates of said second P and second N type devices being interconnected,
  the drains of all of said devices being interconnected;

means for connecting the output of said second NAND gate to the input of said second inverter and to the interconnected gates of said first P and first N type devices;

means for connecting the output of said second inverter to the interconnected gates of said second P and second N type devices;

means for connecting the output of said third inverter to the input of said fourth inverter and to the interconnected sources of said first P and said second N type devices;

means for connecting the output of said fourth inverter to the interconnected sources of said second P and said first N type devices; and means for connecting the drains to the input of said fifth inverter, whereby whenever corresponding bits of the binary numbers which are to be added are applied to the input terminals of said first NAND and NOR gates, the sum signal appears at the output of said fifth inverter, the partial sum signal appears at the output of said second inverter and the carry-out signal, $C_{out}$, appears at the output of said third NAND gate.

* * * * *